United States Patent [19]

Sommargren

[11] Patent Number: 4,717,250
[45] Date of Patent: Jan. 5, 1988

[54] ANGLE MEASURING INTERFEROMETER
[75] Inventor: Gary E. Sommargren, Madison, Conn.
[73] Assignee: Zygo Corporation, Middlefield, Conn.
[21] Appl. No.: 845,926
[22] Filed: Mar. 28, 1986
[51] Int. Cl.⁴ .................................................. G01B 9/02
[52] U.S. Cl. .................................... 356/349; 356/351; 356/363
[58] Field of Search ...................... 356/349, 351, 363
[56] References Cited

U.S. PATENT DOCUMENTS 3,656,853  4/1972  Bagley et al. .................... 356/349
3,788,746  1/1974  Baldwin et al. .................. 356/349
3,790,284  2/1974  Baldwin .......................... 356/349

OTHER PUBLICATIONS

Bennett, "A Double-Passed Michelson Interferometer", *Optics Communications*, vol. 4, No. 6, pp. 428–430, 3/72.

*Primary Examiner*—Davis L. Willis
*Assistant Examiner*—Matthew W. Koren
*Attorney, Agent, or Firm*—Stiefel, Gross, Kurland & Pavane

[57] ABSTRACT

An angle measuring interferometer comprises a source (10) which emits a light beam containing two orthogonally polarized components of different frequencies; a source of a stabilized electrical reference signal (11) of a frequency corresponding to a difference frequency between the two components of the light beam; means, such as a tilted shear plate (16) or a beamsplitter/beam folder assembly (116, 116A) for converting the input beam into two separated, parallel, orthogonally polarized beams; a half-wave retardation plate (29A, 29) located in one of the separated beams for converting the two separated parallel orthogonally polarized beams into two separated parallel beams with the same polarization and frequency difference; means including a polarizing beamsplitter (44), for causing each of the separated different frequency parallel beams with the same polarization to be reflected once by each of two plane mirrors (71, 70) to produce two parallel output beams with the same polarization; a half-wave retardation plate (29B, 29) located in one of the separated parallel output beams, for converting the two separated parallel output beams of the same polarization into two separated parallel output beams with orthogonal polarization, with means, such as the tilted shear plate (16) or the beamsplitter/beam folder assembly (116, 116B), converting the two separated parallel orthogonally polarized output beams into a single output beam in which the phase difference, "δ", between the two frequency components of the single output beam is directly proportional to the angle, "θ", between the two plane mirrors (70, 71); a polarizer (81) for mixing the orthogonal components of the output beam; a photoelectric detector (83) to produce the measurement signal; and a phase/meter accumulator (90) to indicate the phase difference, "Δδ", between the reference and measurement signals which is directly proportional to the changes in the angular orientation, "Δθ", between the two plane mirrors (70, 71).

94 Claims, 4 Drawing Figures

ANGLE MEASURING INTERFEROMETER

BACKGROUND OF THE INVENTION

1. Field of the Invention

The present invention relates to apparatus for the measurement of changes in angular orientation between two plane mirrors. More particularly, the invention relates to optical apparatus which is useful for high accuracy angle metrology using interferometry.

2. The Prior Art

High accuracy displacement and angle measurement are required in the machine tool industry and in the semiconductor fabrication industry. Displacement is commonly measured with an interferometer. Angles are commonly measured with either an interferometer or an autocollimator.

While there are numerous interferometer configurations which can be used to measure changes in angular orientation between two plane mirrors, none provides a high speed electrical output which is insensitive to changes in the displacement between the two mirrors. In conventional interferometers, changes in angular orientation between two mirrors manifests itself, in general, as a change in fringe spacing and a rotation of the fringe pattern while changes in the displacement between the two mirrors manifests itself as a translation of the fringes. Thusly, it takes rather complex, time consuming processing to separate these effects in order to extract the desired angular information. Therefore, for high accuracy angular measurement of precision, high speed X-Y stages used in microlithography, the prior art interferometers are not used.

An adaption of a displacement interferometer has been used to make angular measurements, see for example R. R. Baldwin, L. E. Truhe, and D. C. Woodruff, "Laser Optical Components for Machine Tool and Other Calibration," Hewlett-Packard Journal, pp. 14–16, April 1983. However, this apparatus measures the changes in angular orientation of a pair of retroreflectors and not a plane mirror. Thusly, it measures changes in angular orientation of a part which can be displaced in only one dimension, i.e., displacements parallel to the direction of the incident laser beams. Therefore, this apparatus is also not useful for the high accuracy angular measurements of precision X-Y stages.

Autocollimators provide many of the desired characteristics, see for example D. Malacara, *Optical Shop Testing*, p. 467, John Wiley & Sons (1978). However, for high accuracy measurements, interferometers are preferred because their measurements are based directly on a stable, fixed, built-in measurement unit, i.e., the wavelength of light.

The present invention retains the preferred characteristics of both the autocollimator and the interferometer while avoiding the serious limitations of prior art apparatus. In the present invention, the angular measurement is insensitive to not one but rather to three dimensional displacements of the plane mirrors, and the measurement is interferometric so that it is based on the wavelength of light. The improvements of the present invention thusly overcome the disadvantages of the prior art and allow the high accuracy, i.e., to a small fraction of an arc second, angular measurement required for precision, high speed X-Y stages.

SUMMARY OF THE INVENTION

In accordance with the instant invention, I provide an angle measuring interferometer system capable of measuring accurately changes in the angular orientation between two plane mirrors comprising: (1) a source of an input beam with two stabilized optical frequencies, with the two different frequencies orthogonally polarized, and with a frequency difference between the two frequencies equal to "$f_o$", (2) means in said source, either a frequency stabilized electronic oscillator or a photoelectric mixer with electronic amplifier, for providing an electrical reference signal which corresponds to the frequency difference, "$f_o$," between said two stabilized optical frequencies; (3) means, most preferably a tilted shear plate with regions of antireflection and polarizing coatings, or a beamsplitter/beam folder assembly with regions of antireflection and polarizing coatings, for converting said input beam into two separated, parallel, orthogonally polarized beams; (4) means, most preferably a half-wave retardation plate, located in one of said separated beams, for converting said two separated, parallel, orthogonally polarized beams into two separated, parallel, beams with the same polarization and frequency difference; (5) means, most preferably a polarizing beamsplitter, quarter-wave retardation plate, and retroreflector, for causing each of said separated different frequencies, parallel beams with the same polarization to be reflected once by each of two plane mirrors to produce two parallel output beams with the same polarization; (6) means, most preferably a half-wave retardation plate, located in one of said separated, parallel output beams for converting said two separated, parallel output beams of the same polarization into two separated, parallel output beams with orthogonal polarization; (7) means, most preferably the aforementioned tilted plate with regions of antireflection and polarizing coatings, or a beamsplitter/beam folder assembly with regions of antireflection and polarizing coatings, for converting said two separated, parallel, orthogonally polarized output beams into a single output beam in which the variation in phase difference, "$\Delta\delta$", between the two frequency components of said single output beam is directly proportional to the variation in angle, "$\Delta\theta$", between said two plane mirrors; (8) means, most preferably a polarizer, for mixing said orthogonal components of said single output beam; (9) means, most preferably a photoelectric detector, to produce an electrical measurement signal; and (10) means, most preferably a phase meter/accumulator, to indicate the variation in phase difference, "$\Delta\delta$", between said electrical reference signal and said electrical measurement signal, said variation in phase difference, "$\Delta\delta$", being proportional to the variation in angle between said two plane mirrors.

THE DRAWINGS

DETAILED DESCRIPTION OF THE INVENTION

Figure 1:
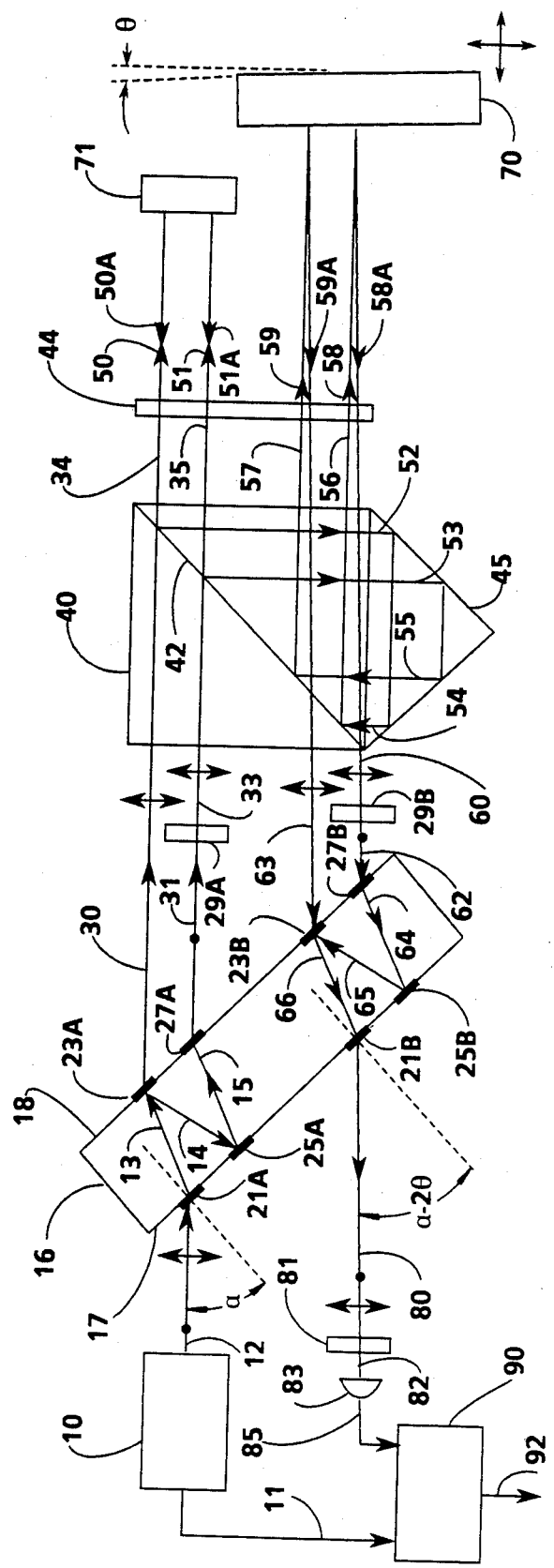
FIG. 1 depicts in schematic form one embodiment of the instant invention where all optical beams are in a single plane.

FIG. 1 depicts in schematic form one embodiment of the instant invention where all optical beams are in a single plane. While the apparatus has application for a wide range of radiation sources, the following description is taken by way of example with respect to an optical measuring system. Light source (10), which most preferably uses a laser, emits input beam (12) which is comprised of two stabilized frequency components which are orthogonally polarized as indicated by the dot and arrow, see, for example, Bagley et al. U.S. Pat. No. 3,458,259 issued July 26, 1969 and commonly owned, copending U.S. patent applications Ser. Nos. 710,859, entitled "Apparatus to Transform a Single Frequency, Linearly Polarized Laser Beam Into a Beam with Two Orthogonally Polarized Frequencies" filed Mar. 12, 1985; 710,947, entitled "Heterodyne Interferometer System", filed Mar. 12, 1985; 710,927, entitled "Apparatus to Transform a Single Frequency, Linearly Polarized Laser Beam into a High Efficiency Beam with Two Orthogonally Polarized Frequencies, filed Mar. 12, 1985; 810,999, entitled "Differential Plane Mirror Interferometer," filed Dec. 19, 1985; and the commonly owned copending contemporaneously filed application entitled "Differential Plane Mirror Interferometer Having Beamsplitter/Beam Folder Assembly, the contents of all of which are specifically incorporated by reference herein in their entirety. Source (10) provides an electrical reference signal (11) which corresponds to the frequency difference between the two stabilized frequencies.

Figure 3:
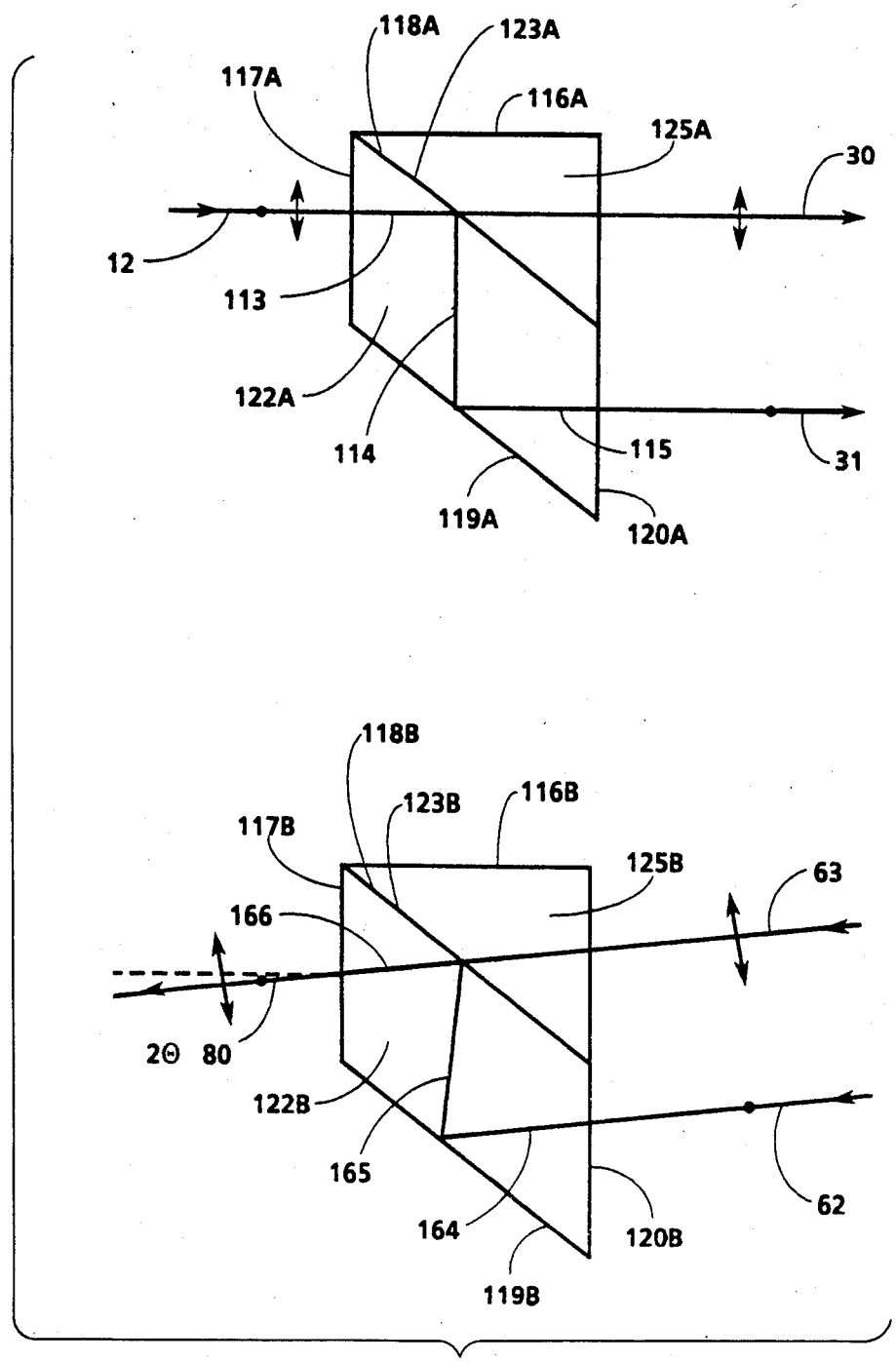
FIG. 3 depicts in schematic form an alternative embodiment of the arrangement shown in FIG. 1 where the tilted shear plate is replaced by a beamsplitter/beam folder assembly.
Figure 4:
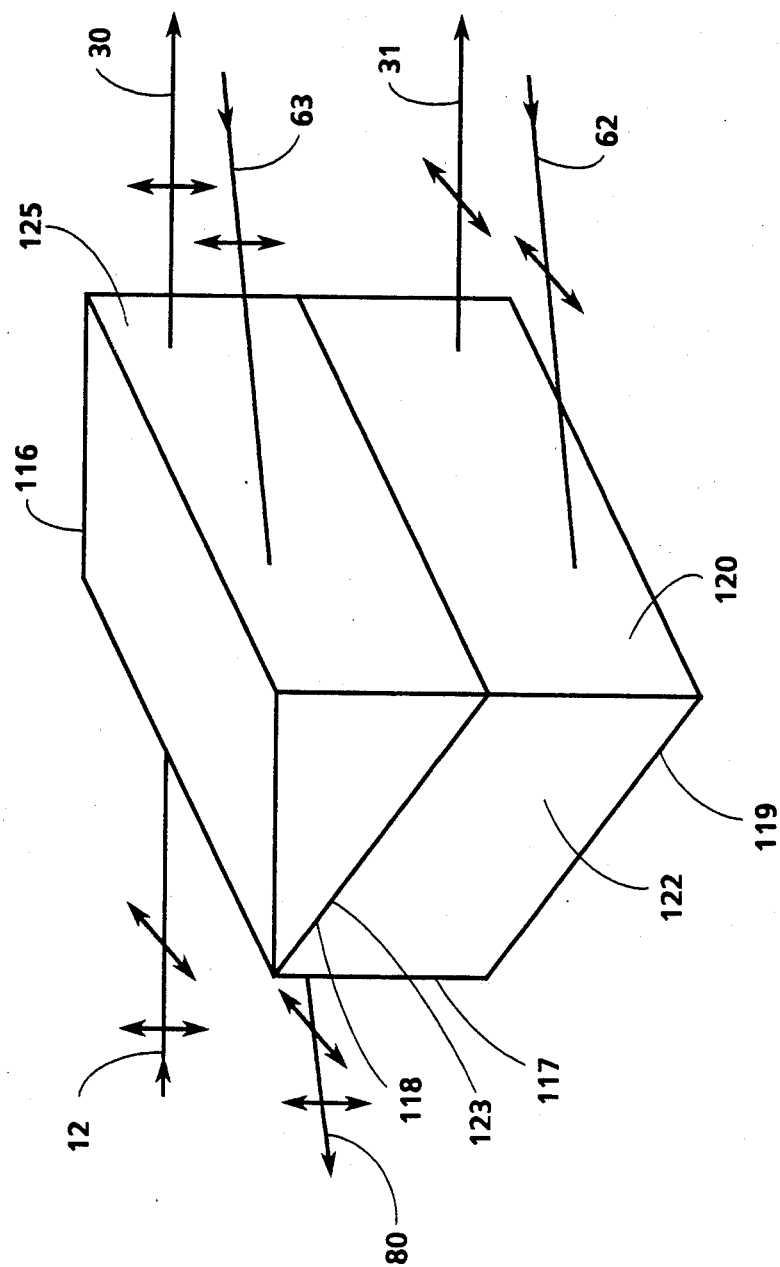
FIG. 4 depicts in schematic form an alternative embodiment of the arrangement shown in FIG. 2 where the tilted shear plate is replaced by a beamsplitter/beam folder assembly.

In the embodiment of FIG. 1, beam (12) is incident on shear plate (16) which is a tilted glass substrate with optically flat surfaces (17) and (18) which are mutually parallel. The function of shear plate (16) is to spatially separate the two frequency components using conventional polarization techniques. If desired, this function can be accomplished by a beamsplitter/beam folder assembly, such as illustrated in the embodiments of FIGS. 3 and 4, in place of tilted shear plate (16). Beam (12) passes through surface (17) to become beam (13) which has the same polarization as beam (12). Surface (17) has an antireflection coating (21A) over the region where beam (12) passes through it. Polarizing coating (23A) on surface (18) splits beam (13) so that one polarized frequency component is transmitted as beam (30) whereas the other orthogonally polarized frequency component is reflected as beam (14). Beam (14) is totally reflected from reflective coating (25A) on surface (17) to become beam (15). Beam (15) passes through surface (18) to become beam (31) which has the same polarization as beam (15). Surface (18) has an antireflection coating (27A) over the region where beam (15) passes through it.

Beam (31) passes through half-wave retardation plate (29A) which rotates the linear polarization of beam (31) by 90° so that resultant beam (33) has the same polarization (but still a different frequency) as beam (30). Beams (30) and (33) enter polarizing beamsplitter (40) with polarizing coating (42) and are transmitted as beams (34) and (35), respectively. Beams (34) and (35) pass through quarter-wave retardation plate (44) and are converted into circularly polarized beams (50) and (51), respectively. Beams (50) and (51) are reflected from fixed reference mirror (71) to become beams (50A) and (51A). Beams (50A) and (51A) pass back through quarter-wave retardation plate (44) and are converted back into linearly polarized beams which are orthogonally polarized to the original incident beams (34) and (35). Beams (50A) and (51A) are reflected by polarizing coating (42) to become beams (52) and (53). Beams (52) and (53) are reflected by retroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59).

Beams (58) and (59) are reflected from movable mirror (70) to become beams (58A) and (59A). Beams (58A) and (59A) pass back through quarter-wave retardation plate (44) and are converted back into linearly polarized beams which are polarized the same as the original incident beams (34) and (35). Beams (58A) and (59A) are transmitted by polarized coating (42) and leave polarizing beamsplitter (40) as beams (60) and (63). Beams (60) and (63) are mutually parallel, independent of any tilt that may be present between mirrors (70) and (71). Beam (60) passes through half-wave retardation plate (29B) which rotates the linear polarization of beam (60) by 90° so that resultant beam (62) has a linear polarization which is orthogonal to beam (63). Beam (62) passes through surface (18) to become beam (64) which has the same polarization as beam (62). Surface (18) has an antireflection coating (27B) over the region where beam (62) passes through it. Beam (64) is totally reflected from reflective coating (25B) to become beam (65). Surface (18) has reflective coating (25B) over the region where beam (64) intersects it. Beams (65) and (63) are recombined to form beam (66) by polarizing coating (23B). Surface (17) has polarizing coating (23B) over the region where beams (65) and (63) intersect. Beam (66) passes through surface (17) to become beam (80). Surface (17) has an antireflection coating (21B) over the region where beam (66) passes through it.

Beam (80), like input beam (12), has two frequency components which are orthogonally polarized. Each frequency component has traversed exactly the same optical path length (through air and glass) except for the optical path length difference through shear plate (16) due to angular tilt between mirrors (70) and (71). This results in a phase difference, "$\delta$", between the two frequency components of beam (80) and is given by $$\delta = \frac{4\pi h n}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of shear plate (16), "n" is the refractive index of shear plate (16), "$\lambda$" is the wavelength of light source (10), "$\alpha$" is the angle of incidence of beam (12) on shear plate (16) and "$\theta$" is the angular tilt of mirror (70) in the plane of beams (58) and (59). Only tilt, or a component of tilt, in this plane will cause "$\delta$" to vary. Translation of mirror (70) will not influence "$\delta$". Small variations in the tilt, "$\Delta\theta$", are directly proportional to variations in phase difference, "$\Delta\delta$" and are approximately given by $$\Delta\theta = \frac{n\lambda}{4\pi h} \frac{\sqrt{1 - \left(\frac{\sin\alpha}{n}\right)^2}}{\sin 2\alpha} \Delta\delta$$

This phase variation is measured by passing beam (80) through polarizer (81), oriented at 45° to each polarization component, which mixes the two orthogonally polarized frequency components in beam (80) to give beam (82). The interference between the two frequency components is detected by photodetector (83) as a sinusoidal intensity variation with a frequency equal to the difference frequency between the two components of beam (12). The variation of phase between sinusoidal electrical output (85) and sinusoidal electrical reference signal (11) is measured by the phase meter/accumulator (90), see for example the aforementioned commonly owned copending U.S. patent application Ser. No. 710,928, to provide the output (92) which is directly proportional to the change in tilt between mirrors (70) and (71). This optical configuration is extremely insensitive to measurement error because changes in the other optical components, such as those induced mechanically or thermally, affect both frequency components equally and therefore have no influence on the measured phase variation (92). In addition, environmental effects, such as variations in the refractive index of air, can be minimized by placing mirror (71) close to mirror (70) to reduce the optical path length difference between the two frequency components. It should be noted that half-wave retardation plates (29A) and (29B) could be a single element with a hole in it to allow beam (63) to pass through it unaffected.

Figure 2:
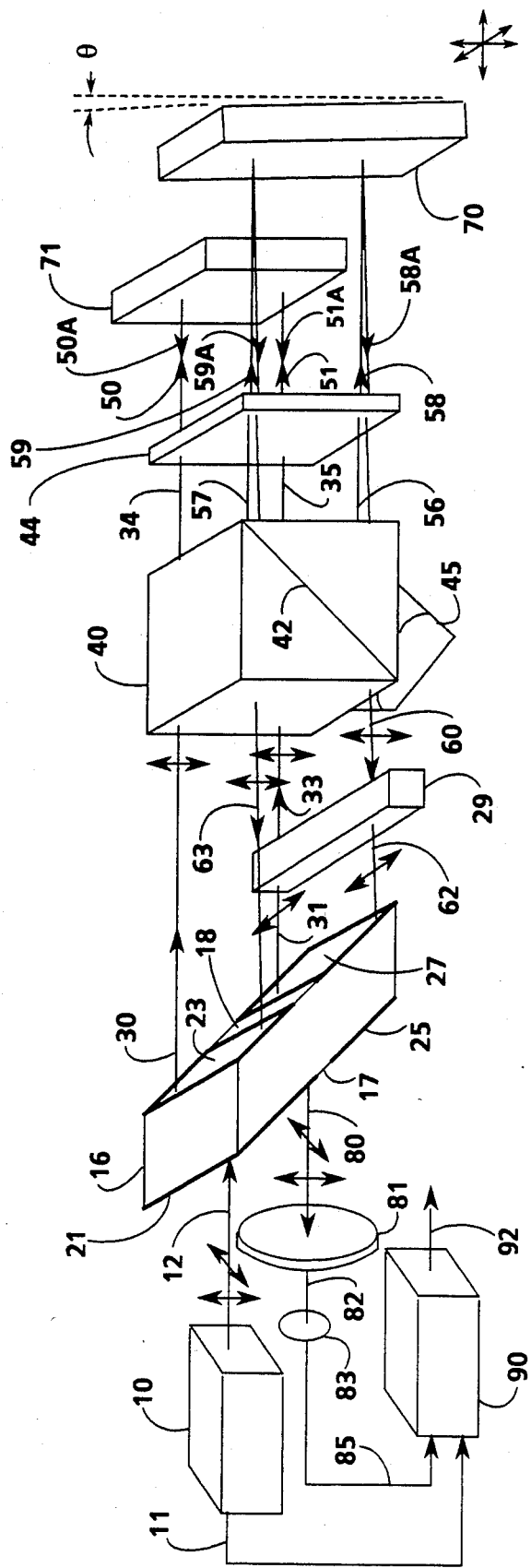
FIG. 2 depicts in schematic form a second embodiment of the instant invention where the optical beams are not in a single plane.

FIG. 2 depicts in schematic form a second embodiment of the instant invention where the optical beams are not in a single plane. This configuration permits a more compact optical system. The description of this figure is identical to FIG. 1 and is numbered correspondingly. The only differences are that now coatings (21A) and (21B), (23A) and (23B), (25A) and (25B), and (27A) and (27B) in FIG. 1 become coatings (21), (23), (25), and (27), respectively; and half-wave retardation plates (29A) and (29B) in FIG. 1 become single half-wave retardation plate (29).

Thus, in FIG. 2, light source (10), which as previously mentioned, most preferably uses a laser, emits input beam (12) which is comprised of two stabilized frequency components which are orthogonally polarized as indicated by the two arrows. Source (10) also provides an electrical reference signal (11) which again corresponds to the frequency difference between the two stabilized frequencies. Beam (12) is incident on shear plate (16) which is a tilted glass substrate with optically flat surfaces (17) and (18) which are mutually parallel. The function of shear plate (16) is to spatially separate the two frequency components using conventional polarization techniques. Again, this function can also be accomplished by a beamsplitter/beam folder assembly if desired. Thus, in the embodiment of FIG. 2, beam (12) is divided by shear plate (16), with aid of antireflection coatings (21) and (27), polarizing coating (23) and reflective coating (25), to become vertically polarized beam (30) and horizontally polarized beam (31). Beam (31) passes through the single half-wave retardation plate (29) which rotates the linear polarization of beam (31) by 90° so that resultant beam (33) has the same polarization (but still a different frequency) as beam (30). Beams (30) and (33) enter polarizing beamsplitter (40) with polarizing coating (42) and are transmitted as beams (34) and (35), respectively. Beams (34) and (35) pass through quarter-wave retardation plate (44) and are converted into circularly polarized beams (50) and (51), respectively. Beams (50) and (51) are reflected from fixed reference mirror (71) to become beams (50A) and (51A). Beams (50A) and (51A) pass back through quarter-wave retardation plate (44) and are converted back into linearly polarized beams that are orthogonally polarized to the original incident beams (34) and (35). Beams (50A) and (51A) are reflected by polarizing coating (42) to become beams (52) and (53). Beams (52) and (53) are reflected by rectroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59). Beams (58) and (59) are reflected from movable mirror (70) to become beams (58A) and (59A). Beams (58A) and (59A) pass back through quarter-wave retardation plate (44) and are converted back into linearly polarized beams that are polarized the same as the original incident beams (34) and (35). Beams (58A) and (59A) are transmitted by polarized coating (42) and leave polarizing beamsplitter (40) as beams (60) and (63). Beams (60) and (63) are mutually parallel, independent of any tilt that may be present between mirrors (70) and (71). Beam (60) passes through the single half-wave retardation plate (29) which rotates the linear polarization of beam (60) by 90° so that resultant beam (62) has a linear polarization which is orthogonal to beam (63). Beams (62) and (63) are combined by shear plate (16), with the aid of antireflection coatings (21) and (27), polarizing coating (23) and reflective coating (25), to become beam (80).

Once again beam (80), in the embodiment of FIG. 2, like input beam (12), has two frequency components which are orthogonally polarized. Each frequency component, as was true with the FIG. 1 embodiment, has traversed exactly the same optical path length (through air and glass) except for the optical path length difference through shear plate (16) due to angular tilt between mirrors (70) and (71). This results in a phase difference, "δ", between the two frequency components of beam (80) and is given by $$\delta = \frac{4\pi h n}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of shear plate (16), n is the refractive index of shear plate (16), "λ" is the wavelength of light source (10), "α" is the angle of incidence of beam (12) on shear plate (16) and "θ" is the angular tilt of mirror (70) in the plane of beams (58) and (59). Only tilt, or a component of tilt, in this plane will cause "δ" to vary. Translation of mirror (70) will not influence "δ". Small variations in the tilt, "Δθ", are directly proportional to variations in phase difference, "Δδ", and are approximately given by $$\Delta\theta = \frac{n\lambda}{4\pi h} \frac{\sqrt{1 - \left(\frac{\sin\alpha}{n}\right)^2}}{\sin 2\alpha} \Delta\delta$$

This phase variation is measured by passing beam (80) through polarizer (81), oriented at 45° to each polarization component, which mixes the two orthogonally polarized frequency components in beam (80) to give beam (82). As was also true on the FIG. 1 embodiment, the interference between the two frequency components is detected by photodetector (83) as as sinusoidal intensity variation with a frequency equal to the difference frequency between the two components of beam (12). The variation of phase between sinusoidal electrical output (85) and sinusoidal electrical reference signal (11) is measured by the phase meter/accumulator (90), to provide the output (92) which as previously mentioned with respect to the FIG. 1 embodiment, is directly proportional to the change in tilt between mirrors (70) and (71). Thus, both the FIGS. 1 and 2 embodiments employ optical configurations which are extremely insensitive to measurement error because changes in the other optical components, such as those induced mechanically or thermally, affect both frequency components equally and therefore have no influence on the measured phase variation (92). In addition, as was previously mentioned with reference to the FIG. 1 embodiment, environmental effects, such as variations in the refractive index of air, can be minimized by placing mirror (71) close to mirror (70) to reduce the optical path length difference between the two frequency components.

Although the configuration depicted in FIGS. 1 and 2 is the preferred embodiment, shear plate (16) may be replaced by one of a variety of optical elements which spatially separate the two frequency components of beam (12) to give two mutually parallel and orthogonally polarized beams (30) and (31) and which also recombine beams (62) and (63) to give a single beam (80) comprised of the two orthogonally polarized frequency components. One such optical element is shown in FIGS. 3 and 4.

FIG. 3 depicts in schematic form one alternative to shear plate (16), which is shown in FIG. 1, where all the optical beams are in a single plane. This optical element is comprised of two beamsplitter/beam folder assemblies (116A) and (116B). In turn, beamsplitter/beam folder assemblies (116A) and (116B) are comprised of right angle prisms (125A) and (125B), and rhomboid prisms (122A) and (122B) respectively. Beam (12) passes through surface (117A) to become beam (113) which has the same polarization as beam (12). Surface (117A) has an antireflection coating over the region where beam (12) passes through it. Polarizing coating (123A) on surface (118A) splits beam (113) so that one polarized frequency component is transmitted as beam (30) whereas the other orthogonally polarized frequency component is reflected as beam (114). Beam (114) is reflected by surface (119A) with its state of polarization unaltered to become beam (115). Beam (115) passes through surface (120A) to become beam (31) which has the same polarization as beam (115) and which is parallel to beam (30). Surface (120A) has an antireflection coating over the regions where beams pass through it.

Return beams (62) and (63) are incident on beamsplitter/beam folder (116B). Beam (62) passes through surface (120B) to become an (164) which has the same polarization as beam (62). Surface (120B) has an antireflection coating over the regions where beams pass through it. Beam (164) is totally reflected by surface (119B) with its state of polarization unaltered to become beam (165). Beams (165) and (63) are recombined to form beam (166) by polarizing coating (123B). Surface (118B) has polarizing coating (123B) over the region where beams (165) and (63) intersect. Beam (166) passes through surface (117B) to become beam (80). Surface (177B) has an antireflection coating over the region where beam (166) passes through it.

If desired, a single beamsplitter/beam folder assembly could be constructed to functionally perform the operations of the two beamsplitter/beam folder assemblies (116A) and (116B) without departing from the spirit and scope of the present invention, such as illustrated in the embodiment of FIG. 4.

FIG. 4 depicts in schematic form a second embodiment of the beamsplitter/beam folder where the optical beams are not in a single plane. This configuration permits a more compact optical system. The description of this figure is identical to FIG. 3 and is numbered correspondingly. The only differences are that now the two beamsplitter/beam folder assemblies (116A) and (116B) illustrated in the embodiments of FIG. 3 are replaced by a single beamsplitter/beam folder assembly (116) comprised of right angle prism (125) and rhomboid prism (122). Beam (12) is divided by beamsplitter/beam folder assembly (116) with aid of antireflection coatings on surfaces (117) and (120) and polarizing coating (123) on surface (118) to become vertically polarized beam (30) and horizontally polarized beam (31). Return beams (62) and (63) are recombined by beamsplitter/beam folder assembly (116) with aid of antireflection coatings on surfaces (117) and (120) and polarizing coating (123) on surface (118) to become beam (80).

Using the beamsplitter/beam folder assembly (116A, 116B, 116) in FIGS. 3 and 4 produces a resultant phase difference, "$\delta$", between the two frequency components of beam (80) now given by $$\delta = \frac{4\pi nh}{\sqrt{2}\,\lambda} \left[ \frac{\sin 2\theta}{n} + \sqrt{1 - \left(\frac{\sin 2\theta}{n}\right)^2} - 1 \right]$$

where "h" is now the thickness of the rhomboid prism, "n" is the refractive index of the rhomboid prism, "$\lambda$" is the wavelength of the light source, and "$\theta$" is the angular tilt of the pair of plane mirrors with respect to each other. Small variations in the tilt, "$\Delta\theta$", are now approximately given by $$\Delta\theta = \frac{\sqrt{2}}{2}\left(\frac{\lambda}{4\pi h}\right) \Delta\delta$$

where "$\Delta\delta$" is the variation of the phase difference "$\delta$".

The principal advantages of the instant invention are: (1) it uses plane mirrors rather than retroreflectors; (2) the measurement accommodates and is insensitive to mirror translation in three dimensions; (3) the measurements are based on the wavelength of light, and (4) high speed measurements can be made.

Although the invention has been described with respect to a light source which emits two stabilized, orthogonally polarized beams of different frequencies, it can also be used when the frequencies are equal without departing from the spirit and scope of the present invention.

While a preferred embodiment of the invention has been disclosed, obviously modification can be made therein, without departing from the scope of the invention as defined in the following claims.

What is claimed is:

1. An angle measuring plane mirror interferometric system comprising: a pair of plane mirrors being angularly variable with respect to each other by a variable angle-between said pair of plane mirrors; source means for emitting an input beam comprising two stabilized orthogonally polarized optical frequencies having a frequency difference, said source means further comprising means for providing an electrical reference signal corresponding to said frequency difference between said two stabilized optical frequencies; means optically coupled to said input beam for converting said input beam into two separated parallel orthogonally polarized beams; means optically disposed in the path of one of said two separated parallel orthogonally polarized beams for converting said two separated parallel orthogonally polarized beams into two separated parallel beams having the same polarization and frequency difference; means optically coupled to said two separated parallel same polarized beams for causing each of said separated different frequency parallel same polarized beams to be reflected once by each one of said pair of angularly variable plane mirrors to produce two parallel output beams having the same polarization; means optically disposed in the path of one of said two separated same polarized parallel output beams for converting said two separated same polarized parallel output beams into two separated orthogonally polarized parallel output beams; means optically coupled to said two separated parallel orthogonally polarized output beams for converting said two separated parallel orthogonally polarized output beams into a single output beam having a pair of orthogonally polarized frequency components, with a phase difference therebetween being directly proportional to said variable angle between said pair of plane mirrors; means optically coupled to said single output beam for mixing said orthogonally polarized components thereof and producing an electrical measurement signal therefrom; and means operatively connected to said electrical measurement signal and said electrical reference signal for indicating a difference in phase between said electrical reference signal and said electrical measurement signal, variations in said indicated phase difference being proportional to angular changes in said variable angle between said pair of plane mirrors; whereby an optical configuration in which the angular measurements are extremely insensitive to three dimensional displacement of said plane mirrors is provided for said interferometric system.

2. An angle measuring plane mirror interferometric system in accordance with claim 1 wherein said means for converting said two separated parallel orthogonally polarized output beams into said single output beam having said pair of orthogonally polarized frequency components comprises a shear plate means.

3. An angle measuring plane mirror interferometric system in accordance with claim 2, wherein said shear plane means comprises means for providing said pair of orrthogonally polarized frequency components with said phase difference "$\delta$" in accordance with the expression $$\delta = \frac{4\pi h n}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of said shear plate, "n" is the refractive index of said shear plate, "$\lambda$" is the wavelength of said input beam source means, "$\alpha$" is the angle of incidence of said input beam on said shear plate and "$\theta$" is the angular tilt of said pair of plane mirrors with respect to each other.

4. An angle measuring plane mirror interferometric system in accordance with claim 3 wherein said angular change "$\Delta\theta$" for small variations in said angular tilt is defined by the expression $$\Delta\theta = \frac{n\lambda}{4\pi h} \frac{\sqrt{1 - \left(\frac{\sin\alpha}{n}\right)^2}}{\sin 2\alpha} \Delta\delta$$

where "$\Delta\delta$" is the variation in said phase difference.

5. An angle measuring plane mirror interferometric system in accordance with claim 3 wherein said source means comprises a laser.

6. An angle measuring plane mirror interferometric system in accordance with claim 5 wherein one of said pair of angularly variable plane mirrors is fixed and comprises a reference mirror and the other of said pair of plane mirrors is tiltable for providing said variable angle between said pair of angularly variable plane mirrors.

7. An angle measuring plane mirror interferometric system in accordance with claim 3 wherein one of said pair of angularly variable plane mirrors is fixed and comprises a reference mirror and the other of said pair of plane mirrors is tiltable for providing said variable angle between said pair of angularly variable plane mirrors.

8. An angle measuring plane mirror interferometric system in accordance with claim 4 wherein said source means comprises a laser.

9. An angle measuring plane mirror interferometric system in accordance with claim 8 wherein one of said pair of angularly variable plane mirrors is fixed and comprises a reference mirror and the other of said pair of plane mirrors is tiltable for providing said variable angle between said pair of angularly variable plane mirrors.

10. An angle measuring plane mirror interferometric system in accordance with claim 4 wherein one of said pair of angularly variable plane mirrors is fixed and comprises a reference mirror and the other of said pair of mirrors is tiltable for providing said variable angle between said pair of angularly variable plane mirrors.

11. An angle measuring plane mirror interferometric system in accordance with claim 2 wherein said shear plane means comprises a tilted shear plane means.

12. An angle measuring plane mirror interferometric system in accordance with claim 11 said tilted shear plate means comprises means for providing said pair of orthogonally polarized frequency components with said phase difference "δ" in accordance with the expression $$\delta = \frac{4\pi h n}{\lambda}\left[\sqrt{1-\left(\frac{\sin(\alpha-2\theta)}{n}\right)^2} - \sqrt{1-\left(\frac{\sin\alpha}{n}\right)^2}\right]$$

where "h" is the thickness of said shear plate, "n" is the refractive index of said shear plate, "λ" is the wavelength of said input beam source means, "α" is the angle of incidence of said input beam on said shear plate and "θ" is the angular tilt of said pair of plane mirrors with respect to each other.

13. An angle measuring plane mirror interferometric system in accordance with claim 12 wherein said angular change "Δθ" for small variations in said angular tilt is defined by the expression $$\Delta\theta = \frac{n\lambda}{4\pi h} \frac{\sqrt{1-\left(\frac{\sin\alpha}{n}\right)^2}}{\sin 2\alpha} \Delta\delta$$

where "Δδ" is the variation in said phase difference.

14. An angle measuring plane mirror interferometric system in accordance with claim 13 wherein said source means comprises a laser.

15. An angle measuring plane mirror interferometric system in accordance with claim 12 wherein said source means comprises a laser.

16. An angle measuring plane mirror interferometric system in accordance with claim 2 wherein said means for providing an electrical reference signal comprises a frequency stabilized electronic oscillator.

17. An angle measuring plane mirror interferometric system in accordance with claim 2 wherein said means for providing an electrical reference signal comprises a photoelectric mixer and an electronic amplifier means.

18. An angle measuring plane mirror interferometric system in accordance with claim 11 wherein said tilted shear plate means comprises a first set of regions of antireflection and polarizing coatings, said means for converting said two separated parallel orthogonally polarized output beams into said single output beam comprising said first set of regions and coatings on said tilted shear plate means, said tilted shear plate means further comprising a second set of regions of antireflection and polarization coatings, said second set of regions and coatings comprising said input beam converting means.

19. An angle measuring plane mirror interferometric system in accordance with claim 2 said means for converting said two separated parallel orthogonally polarized beams into said two same polarized separated parallel beams comprises a half-wave retardation plate means.

20. An angle measuring plane mirror interferometric system in accordance with claim 2 wherein said means for causing each of said separated parallel same polarized beams to be reflected once by each one of said pair of angularly variable plane mirrors comprises a polarizing beam splitter means and a retroreflector means.

21. An angle measuring plane mirror interferometric system in accordance with claim 20 wherein said means for causing each of said separated parallel same polarized beams to be reflected once by each one of said pair of angularly variable plane mirrors further comprises a quarter wave retardation plate means.

22. An angle measuring plane mirror interferometric system in accordance with claim 2 wherein said means for converting said two separated parallel same polarized output beams into said two separated parallel orthogonally polarized output beams comprises a half-wave retardation plate means.

23. An angle measuring plane mirror interferometric system in accordance with claim 2 wherein said means for producing said electrical measurement signal comprises a polarizer means for mixing said single output beam orthogonal components.

24. An angle measuring plane mirror interferometric system in accordance with claim 23 wherein said means for producing said electrical measurement signal further comprises a photoelectric detector.

25. An angle measuring plane mirror interferometric system in accordance with claim 2 wherein said phase difference indicating means comprises a phase meter/accumulator means.

26. An angle measuring plane mirror interferometric system in accordance with claim 18 wherein said means for converting said two separated parallel orthogonally polarized beams into said two same polarized separated parallel beams comprises a half-wave retardation plate means.

27. An angle measuring plane mirror interferometric system in accordance with claim 18 wherein said means for causing each of said separated parallel same polarized beams to be reflected once by each one of said pair of angularly variable plane mirrors comprises a polarizing beam splitter means and a retroreflector means.

28. An angle measuring plane mirror interferometric system in accordance with claim 27 wherein said means for causing each of said separated parallel same polarized beams to be reflected once by each one of said pair of angularly varible plane mirrors comprises a polarizing beam splitter means and a retroreflector means.

29. An angle measuring plane mirror interferometric system in accordance with claim 28 wherein said means for converting said two separated parallel same polarized output beams into said two separated parallel orthogonally polarized output beams comprises a half-wave retardation plate means.

30. An angle measuring plane mirror interferometric system in accordance with claim 29 wherein said means for producing said electrical measurement signal comprises a polarizer means for mixing said single output beam orthogonal components.

31. An angle measuring plane mirror interferometric system in accordance with claim 2 wherein said source means comprises a laser.

32. An angle measuring plane mirror interferometric system in accordance with claim 2 wherein one of said pair of angularly variable plane mirrors is fixed and comprises a reference mirror and the other of said pair of plane mirrors is tiltable for providing said variable angle between said pair of angularly variable plane mirrors.

33. An angle measuring plane mirror interferometric system in accordance with claim 32 wherein said source means comprises a laser.

34. An angle measuring plane mirror interferometric system in accordance with claim 2 wherein all of said beams are in a single plane.

35. An angle measuring plane mirror interferometric system in accordance with claim 34 wherein all of said beams are optical beams and all of said optical beams are in a single plane.

36. An angle measuring plane mirror interferometric system in accordance with claim 18 wherein said tilted shear plate comprises both said first and second set of regions and coatings.

37. An angle measuring plane mirror interferometric system in accordance with claim 36 wherein said tilted shear plate means comprises a tilted glass substrate having mutually parallel optically flat surfaces, with said sets of regions and coatings being disposed on said optically flat surfaces.

38. An angle measuring plane mirror interferometric system in accordance with claim 18 wherein said tilted shear plate means comprises a tilted glass substrate having mutually parallel optically flat surfaces, with said sets of regions and coatings being disposed on said optically flat surfaces.

39. An angle measuring plane mirror interferometric system in accordance with claim 11 wherein said tilted shear plate means comprises a tilted glass substrate having mutually parallel optically flat surfaces.

40. An angle measuring plane mirror interferometric system in accordance with claim 18 wherein said phase difference indicating means comprises a phase meter/accumulator means.

41. An angle measuring plane mirror interferometric system in accordance with claim 40 wherein said tilted shear plate means comprises a tilted glass substrate having mutually parallel optically flat surfaces, with said sets of regions and coatings being disposed on said optically flat surfaces.

42. An angle measuring plane mirror interferometric system in accordance with claim 41 wherein said tilted shear plate means comprises a common tilted shear plate comprising both said first and second set of regions and coatings.

43. An angle measuring plane mirror interferometric system in accordance with claim 42 wherein said source means comprises a laser.

44. An angle measuring plane mirror interferometric system in accordance with claim 11 wherein all of said beams are in a single plane.

45. An angle measuring plane mirror interferometric system in accordance with claim 44 wherein all of said beams are optical beams and all of said optical beams are in a single plane.

46. An angle mesuring plane mirror interferometric system in accordance with claim 1 wherein said means for converting said input beam into two separated parallel orthogonally polarized beams comprises a beamsplitter/beam folder assembly means.

47. An angle measuring plane mirror interferometric system in accordance with claim 1 wherein said means for providing an electrical reference signal comprises a frequency stabilized electronic oscillator.

48. An angle measuring plane mirror interferometric system in accordance with claim 1 wherein said means for providing an electrical reference signal comprises a photoelectric mixer and an electronic amplifier means.

49. An angle measuring plane mirror interferometer in accordance with claim 46 wherein said beamsplitter/beam folder assembly means comprises a right angle prism and a rhomboid prism.

50. An angle measuring plane mirror interferometric system in accordance with claim 46 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

51. An angle measuring plane mirror interferometric system in accordance with claim 49 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

52. An angle measuring plane mirror interferometric system in accordance with claim 1 wherein said means for converting said two separated parallel orthogonally polarized beams into said two same polarized separated parallel beams comprises a half-wave retardation plate means.

53. An angle measuring interferometric system in accordance with claim 1 wherein said means for causing each of said separated parallel same polarized beams to be reflected once by each one of said pair of angularly variable plane mirrors comprises a polarizing beam splitter means and a retroreflector means.

54. An angle measuring plane mirror interferometric system in accordance with claim 53 wherein said means for causing each of said separated parallel same polarized beams to be reflected once by each one of said pair of angularly variable plane mirrors further comprises a quarter wave retardation plate means.

55. An angle measuring plane mirror interferometric system in accordance with claim 1 wherein said means for converting said two separated parallel same polarized output beams into said two separated parallel orthogonally polarized output beams comprises a half-wave retardation plate means.

56. An angle measuring plane mirror interferometric system in accordance with claim 1 wherein said means for producing said electrical measurement signal comprises a polarizer means for mixing said single output beam orthogonal components.

57. An angle measuring plane mirror interferometric system in accordance with claim 56 wherein said means for producing said electrical measurement signal further comprises a photoelectric detector.

58. An angle measuring plane mirror interferometric system in accordance with claim 1 wherein said phase difference indicating means comprises a phase meter/accumulator means.

59. An angle measuring plane mirror interferometric system in accordance with claim 50 wherein said means for converting said two separated parallel orthogonally polarized beams into said two same polarized separated parallel beams comprises a half-wave retardation plate means.

60. An angle measuring plane mirror interferometric system in accordance with claim 50 wherein said means for causing each of said separated parallel same polarized beams to be reflected once by each one of said pair of angularly variable plane mirrors comprises a polarizing beam splitter means and a retroreflector means.

61. An angle measuring plane mirror interferometric system in accordance with claim 60 wherein said means for causing each of said separated parallel same polarized beams to be reflected once by each one of said pair of angularly variable plane mirrors further comprises a quarter wave retardation plate means.

62. An angle measuring plane mirror interferometric system in accordance with claim 61 wherein said means for converting said two separated parallel same polarized output beams into said two separated parallel orthogonally polarized output beams comprises a half-wave retardation plate means.

63. An angle measuring plane mirror interferometric system in accordance with claim 62 wherein said means for producing said electrical measurement signal comprises a polarizer means for mixing said single output beam orthogonal components.

64. An angle measuring plane mirror interferometric system in accordance with claim 1 wherein said source means comprises a laser.

65. An angle measuring plane mirror interferometric system in accordance with claim 1 wherein one of said pair of angularly variable plane mirrors is fixed and comprises a reference mirror and the other of said pair of plane mirrors is tiltable for providing said variable angle between said pair of angularly variable plane mirrors.

66. An angle measuring plane mirror interferometric system in accordance with claim 65 wherein said source means comprises a laser.

67. An angle measuring plane mirror interferometric system in accordance with claim 1 wherein all of said beams are in a single plane.

68. An angle measuring plane mirror interferometric system in accordance with claim 67 wherein all of said beams are optical beams and all of said optical beams are in a single plane.

69. An angle measuring plane mirror interferometric system in accordance with claim 46 wherein said beamsplitter/beam folder assembly means comprises a first set of regions of antireflection and polarizing coatings, said means for converting said two separated parallel orthogonally polarized output beams into said single output beam comprising said beamsplitter/beam folder assembly means first set of regions and coatings, said beamsplitter/beam folder assembly means further comprising a second set of regions of antireflection and polarizing coatings, said second set of regions and coatings comprising said input beam converting means.

70. An angle measuring plane mirror interferometric system in accordance with claim 69 wherein said first and second regions of polarizing coatings comprise different portions of a common polarizing coating, said beamsplitter/beam folder assembly means comprising a common beamsplitter/beam folder assembly for converting said input beam and said output beam in said angle measuring plane mirror interferometric system.

71. An angle measuring plane mirror interferometric system in accordance with claim 70 wherein said common beamsplitter/beam folder assembly comprises beam entrance and exit surfaces, said first and second regions of antireflection coatings being on said entrance and exit surfaces.

72. An angle measuring plane mirror interferometric system in accordance with claim 71 wherein said beamsplitter/beam folder assembly means comprises a right angle prism and a rhomboid prism.

73. An angle measuring plane mirror interferometric system in accordance with claim 69 wherein said means for causing each of said separated parallel same polarized beams to be reflected once by each one of said pair of angularly variable plane mirrors comprises a polarizing beam splitter means and a retroreflector means.

74. An angle measuring plane mirror interferometric system in accordance with claim 73 wherein said means for causing each of said separated parallel same polarized beams to be reflected once by each one of said pair of angularly variable plane mirrors further comprises a quarter wave retardation plate means.

75. An angle measuring plane mirror interferometric system in accordance with claim 74 wherein said means for converting said two separated parallel same polarized output beams into said two separated parallel orthogonally polarized output beams comprises a half-wave retardation plate means.

76. An angle measuring plane mirror interferometric system in accordance with claim 69 wherein said source means comprises a laser.

77. An angle measuring plane mirror interferometric system in accordance with claim 69 wherein one of said pair of plane mirrors is fixed and comprises a reference mirror and the other of said pair of plane mirrors is tiltable for providing said angle distance between said pair of angularly variable plane mirrors.

78. An angle measuring plane mirror interferometric system in accordance with claim 69 wherein all of said beams are optical beams, said optical beams being in a plurality of planes, with a given optical beam being in a given plane.

79. An angle measuring plane mirror interferometric system in accordance with claim 78 wherein said source means comprises a laser.

80. An angle measuring plane mirror interferometric system in accordance with claim 49 wherein said beamsplitter/beam folder assembly means comprises for providing said pair of orthogonally polarized frequency components with said phase difference "$\delta$" in accordance with the expression $$\delta = \frac{4\pi h n}{\sqrt{2}\,\lambda}\left[\frac{\sin 2\theta}{n} + \sqrt{1 - \left(\frac{\sin 2\theta}{n}\right)^2} - 1\right]$$

wherein "h" is the thickness of the rhomboid prism, "n" is the refractive index of the rhomboid prism, "$\lambda$" is the wavelength of said input beam source means, and "$\theta$" is the angular tilt of said pair of plane mirrors with respect to each other.

81. An angle measuring plane mirror interferometric system in accordance with claim 80 wherein said angular change "$\Delta\theta$" for small variations in said angular tilt is defined by the expression $$\Delta\theta = \frac{\sqrt{2}}{2}\left(\frac{\lambda}{4\pi h}\right)\Delta\delta$$

where "$\Delta\delta$" is the variation in said phase difference.

82. An angle measuring plane mirror interferometric system in accordance with claim 80 wherein said source means comprises a laser.

83. An angle measuring plane mirror interferometric system in accordance with claim 82 wherein one of said pair of angularly variable plane mirrors is fixed and comprises a reference mirror and the other of said pair of plane mirrors is tiltable for providing said variable angle between said pair of angularly variable plane mirrors.

84. An angle measuring plane mirror interferometric system in accordance with claim 80 wherein one of said pair of angularly variable plane mirrors is fixed and comprises a reference mirror and the other of said pair of plane mirrors is tiltable for providing said variable angle between said pair of angularly variable plane mirrors.

85. An angle measuring plane mirror interferometric system in accordance with claim 81 wherein said source means comprises a laser.

86. An angle measuring plane mirror interferometric system in accordance with claim 85 wherein one of said pair of angularly variable plane mirrors is fixed and comprises a reference mirror and the other of said pair of plane mirrors is tiltable for providing said variable angle between said pair of angularly variable plane mirrors.

87. An angle measuring plane mirror interferometric system in accordance with claim 81 wherein one of said pair of angularly variable plane mirrors is fixed and comprises a reference mirror and the other of said pair of plane mirrors is tiltable for providing said variable angle between said pair of angularly variable plane mirrors.

88. An angle measuring plane mirror interferometric system in accordance with claim 1 wherein said phase difference indicating means comprises a phase meter-/accumulator means.

89. An angle measuring plane mirror interferometric system in accordance with claim 88 wherein one of said pair of angularly variable plane mirrors is fixed and comprises a reference mirror and the other of said pair of plane mirrors is tiltable for providing said variable angle between said pair of angularly variable plane mirrors.

90. An angle measuring plane mirror interferometric system in accordance with claim 89 wherein said source means comprises a laser.

91. An angle measuring plane mirror interferometric system in accordance with claim 88 wherein all of said beams are in a single plane.

92. An angle measuring plane mirror interferometric system in accordance with claim 91 wherein all of said beams are optical beams and all of said optical beams are in a single plane.

93. An angle measuring plane mirror interferometric system in accordance with claim 88 wherein all of said beams are optical beams, said optical beams being in a plurality of planes, with a given optical beam being a given plane.

94. An angle measuring plane mirror interferometric system in accordance with claim 93 wherein said source means comprises a laser.

* * * * *